United States Patent
Okamura et al.

(10) Patent No.: US 10,185,274 B2
(45) Date of Patent: Jan. 22, 2019

(54) MOTOR CONNECTION DETECTING DEVICE, MOTOR CONNECTION DETECTING METHOD, IMAGE FORMING DEVICE, AND CONVEYANCE DEVICE

(71) Applicants: Hiroshi Okamura, Kanagawa (JP); Tomohide Kondoh, Kanagawa (JP); Hayato Fujita, Kanagawa (JP)

(72) Inventors: Hiroshi Okamura, Kanagawa (JP); Tomohide Kondoh, Kanagawa (JP); Hayato Fujita, Kanagawa (JP)

(73) Assignee: Ricoh Company Ltd., Tokyo (JP)

( * ) Notice: Subject to any disclaimer, the term of this patent is extended or adjusted under 35 U.S.C. 154(b) by 10 days.

(21) Appl. No.: 15/428,269

(22) Filed: Feb. 9, 2017

(65) Prior Publication Data
US 2017/0255152 A1    Sep. 7, 2017

(30) Foreign Application Priority Data
Mar. 2, 2016    (JP) ................... 2016-040407

(51) Int. Cl.
*G03G 15/00* (2006.01)
*H02P 8/12* (2006.01)
*H02P 8/36* (2006.01)

(52) U.S. Cl.
CPC ........... *G03G 15/6529* (2013.01); *H02P 8/12* (2013.01); *H02P 8/36* (2013.01)

(58) Field of Classification Search
CPC ..................................... H02P 8/12; H02P 8/36
USPC ..................................... 318/696, 34
See application file for complete search history.

(56) References Cited

U.S. PATENT DOCUMENTS

| | | | | |
|---|---|---|---|---|
| 7,327,115 B2* | 2/2008 | Yoshihisa | ................. | H02P 8/36 318/471 |
| 7,639,050 B2* | 12/2009 | Chigira | .................... | H02P 8/22 318/256 |
| 8,129,934 B2* | 3/2012 | Ando | ....................... | H02P 8/32 318/685 |

FOREIGN PATENT DOCUMENTS

| | | |
|---|---|---|
| JP | 11-146690 | 5/1999 |
| JP | 2011-158335 | 8/2011 |

* cited by examiner

*Primary Examiner* — David S Luo
(74) *Attorney, Agent, or Firm* — Harness, Dickey & Pierce, P.L.C.

(57) ABSTRACT

A motor connection detecting device includes: a bipolar stepping motor; a motor driver adapted to control current to be supplied to the bipolar stepping motor; and a controller connected to the bipolar stepping motor and the motor driver. The controller detects voltage of regenerative current generated during motor ON time in which current flows in the bipolar stepping motor, and determines abnormal connection of the bipolar stepping motor. The detected voltage is voltage generated during a fast decay period according to a current attenuation method of the regenerative current.

13 Claims, 5 Drawing Sheets

MOTOR CONNECTION DETECTING DEVICE, MOTOR CONNECTION DETECTING METHOD, IMAGE FORMING DEVICE, AND CONVEYANCE DEVICE

CROSS-REFERENCE TO RELATED APPLICATIONS

This patent application is based on and claims priority pursuant to 35 U.S.C. § 119(a) to Japanese Patent Application No. 2016-040407, filed on Mar. 2, 2016, in the Japan Patent Office, the entire disclosure of which is hereby incorporated by reference herein.

BACKGROUND

Technical Field

The present disclosure relates to a motor connection detecting device, a motor connection detecting method, an image forming device, and a conveyance device.

Description of the Related Art

In the related art, a plurality of stepping motors is used for a DC motor that drives a paper feeding roller for paper conveyance, a drum drive motor that rotationally drives a drum adapted to supply toner, and the like in image forming devices such as a laser printer (LP) and a multifunction peripheral (MFP) that is a digital multifunction peripheral in which a plurality of functions such as a printer function, a copy function, a scanner function, and a facsimile function are integrated in one body.

In this stepping motor, it is necessary to detect abnormal connection such as fall-off of a connector and disconnection of a harness or a motor winding wire. As a known art to detect such abnormal connection of the stepping motor, there is a stepping motor connection detecting circuit adapted to detect, on a driving circuit side, fall-off of a connector, or disconnection or short circuit of wiring between the connector and a stepping motor.

SUMMARY

In one aspect of the invention, a motor connection detecting device includes: a bipolar stepping motor; a motor driver; and a controller. The motor driver controls current to be supplied to the bipolar stepping motor. The controller connected to the bipolar stepping motor and the motor driver detects voltage of regenerative current generated during motor ON time in which current flows in the bipolar stepping motor, and determines abnormal connection of the bipolar stepping motor. The detected voltage is voltage generated during a fast decay period according to a current attenuation method of the regenerative current.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In the following, a motor connection detecting device, a device or a system including the motor connection detecting device (motor drive system, image forming device, and conveyance device), and a motor connection detecting method will be described in detail with reference to the drawings.

Embodiment

Figure 1:
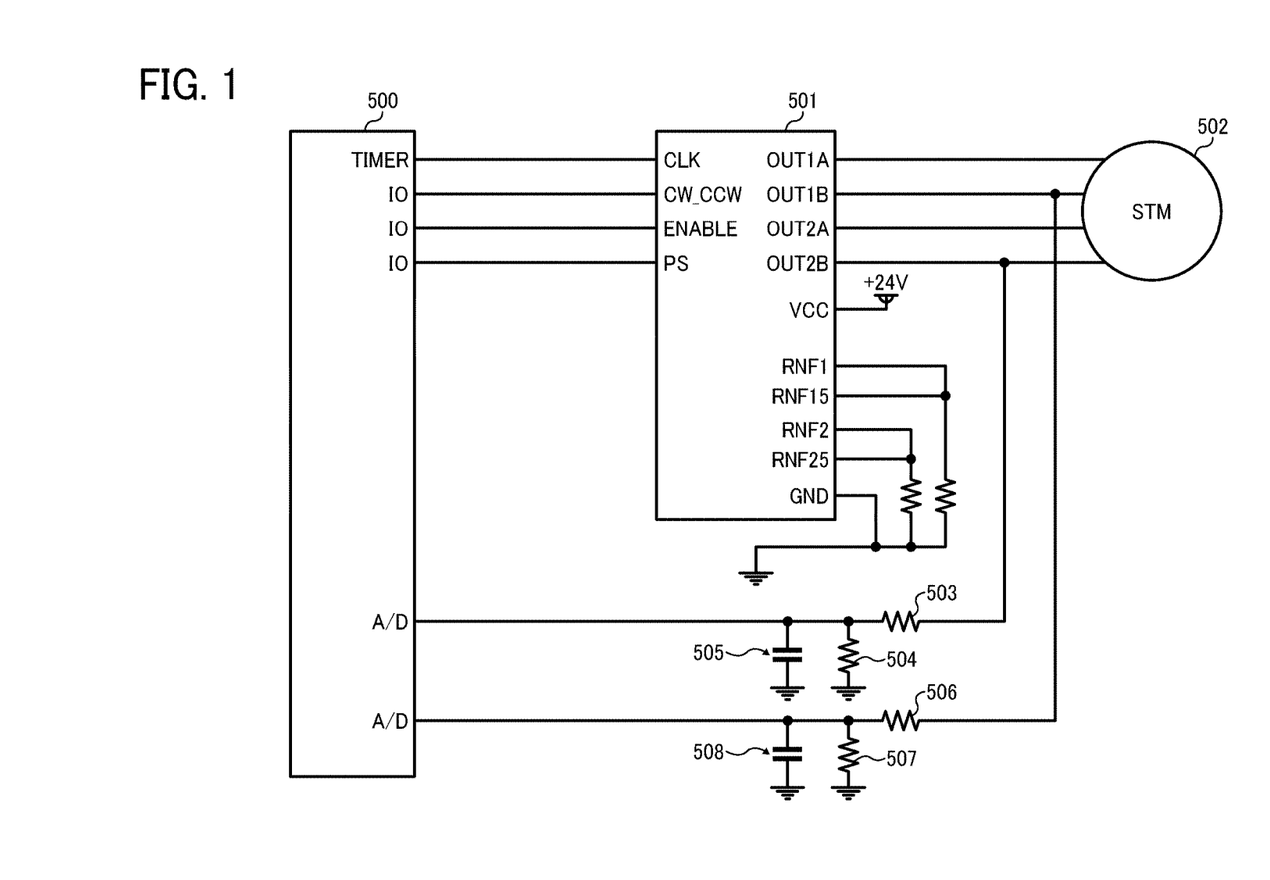
FIG. 1 is a circuit block diagram illustrating a basic configuration of a motor drive system including a motor connection detecting device according to an embodiment of the present invention.

FIG. 1 is a circuit block diagram illustrating a basic configuration of a motor drive system including a motor connection detecting device according to an embodiment of the present invention.

Referring to FIG. 1, the motor drive system includes a bipolar stepping motor (STM) 502 and a motor driver 501 adapted to control current to be supplied to the bipolar stepping motor 502. Additionally, the motor drive system includes a first system CR circuit and a second system CR circuit between the bipolar stepping motor 502 and the motor driver 501. The first system CR circuit includes resistances 503 and 504 and a smoothing capacitor 505 interposed between a motor winding wire corresponding to an output terminal OUT2B of the motor driver 501 and the ground. The second system CR circuit includes resistances 506 and 507 and a smoothing capacitor 508 interposed between a motor winding wire corresponding to an output terminal OUT1B of the motor driver 501 and the ground.

Additionally, the motor drive system includes a controller 500 including a central processing unit (CPU). The controller 500 includes: a detecting function (referred to as detector) adapted to detect voltage of regenerative current generated during motor ON time in which a current flows in the bipolar stepping motor 502; and a determining function (referred to as determination unit) adapted to determine abnormal connection of the bipolar stepping motor 502 based on the detected voltage. Furthermore, the controller 500 provides a command for a current control amount by the motor driver 501.

The controller 500 determines abnormal connection of the bipolar stepping motor 502 based on voltage generated during a fast decay period according to a current attenuation method of regenerative current as described later.

Here, note that functional components considering only the detector and the determination unit will be referred to as a motor connection detecting device in the controller 500 inside this motor drive system.

More particularly describing the respective members, a timer output terminal TIMER of the controller 500 is connected to a clock terminal CLK of the motor driver 501, and the motor driver 501 outputs voltage to excite respective phases of the bipolar stepping motor 502 at timing synchronized with a frequency of a clock signal, and controls current supply. The controller 500 has input/output terminals IOs connected to each of various kinds of control signal terminals CW_CCW, EVABLE, and PS in the motor driver 501, and executes rotational direction control, enable control, and reset control in the motor driver 501. The resistances 503 and 504 related to the first system CR circuit and the resistances 506 and 507 related to the second system CR circuit divide voltage of the output terminals OUT2B and OUT1B of the motor driver 501, and feed the same to respective A/D converters A/D of the controller 500. As a division ratio, a case of dividing power source voltage 24 V of a power source voltage terminal VCC down to a level of 3.3 V may be exemplified here, and in this case, resistance values at the resistances 503 and 506 may be set to 100 kΩ and resistance values at the resistances 504 and 507 may be set to 11 kΩ. The smoothing capacitor 505 related to the first system CR circuit and the smoothing capacitor 508 related to the second system CR circuit not only remove external noise but also smooth output voltage between a slow decay period and the fast decay period according to the current attenuation method of regenerative current described later. Here, a case of setting charge capacity to 0.033 μF may be exemplified. Meanwhile, four pins related to other current detection terminals RNF1 and RNF15 and current detection terminals RNF2 and RNF25, which are grounded interposing resistances together with a ground terminal GND of the motor driver 501, are adapted to detect output current Io that flows in the bipolar stepping motor 502 during the slow decay period and the fast decay period, and used for chopping control drive such that the output the current Io becomes current equal to or less than maximal output current Iomax.

Figure 2A:
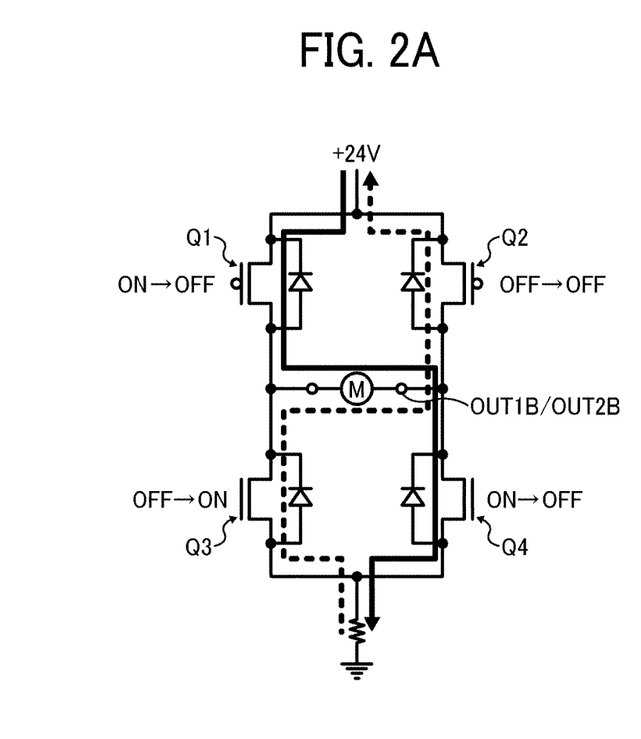
FIGS. 2A and 2B are schematic views illustrating current paths according to a current attenuation method of regenerative current in a motor driver included in the motor drive system in FIG. 1, during a fast decay period and a slow decay period, respectively.
Figure 2B:
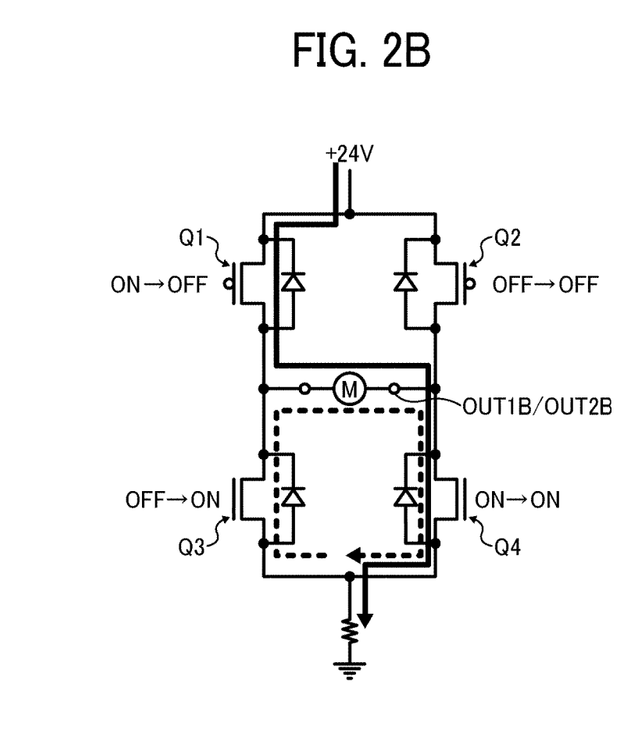

FIGS. 2A and 2B are schematic views illustrating current paths according to the current attenuation method of regenerative current in the motor driver 501 included in the above-described motor drive system, during the fast decay period and the slow decay period, respectively. In FIGS. 2A and 2B, the solid-line indicates a current path during when the power is turned on, and the broken line indicates a current path during the fast decay period.

Referring to FIGS. 2A and 2B, an H bridge control circuit is formed by using four electric field effect transistors (FET) Q1 to Q4 in the motor driver 501 in order to supply a constant current to the bipolar stepping motor 502, and performs chopping control in which output ON/OFF control is performed by controlling switching operation of the electric field effect transistors Q1 to Q4 based on a current detection result at the bipolar stepping motor 502. In the chopping control, mix decay is performed when output of the H bridge control circuit is turned OFF. The mix decay is combination of the slow decay and the fast decay according to the current attenuation method of regenerative current. In a basic function of the H bridge control circuit, a path of a current flowing to the bipolar stepping motor 502 can be switched by turning ON the electric field effect transistors Q1 and Q4 simultaneously or turning ON the electric field effect transistors Q2 and Q3 simultaneously. In FIGS. 2A and 2B, illustrated are following states: when output is turned ON by the chopping control, the electric field effect transistors Q1 to Q4 are selectively turned ON; and when output is turned OFF, the electric field effect transistors Q1 to Q4 are selectively turned OFF. During the fast decay period illustrated in FIG. 2A, the electric field effect transistor Q2 is kept turned OFF, the electric field effect transistor Q3 is switched to ON from OFF, and the electric field effect transistors Q1 and Q4 are switched to OFF from ON at the time of output OFF control (at the time of current attenuation). During the slow decay period illustrated in FIG. 2B, the electric field effect transistor Q4 is kept turned ON, the electric field effect transistor Q2 is kept turned OFF, the electric field effect transistor Q3 is switched to ON from OFF, and the electric field effect transistor Q1 is switched to OFF from ON at the time of output OFF control (at the time of current attenuation). In both of the cases, the regenerative current at the time of output OFF control (at the time of current attenuation) flows in the H bridge control circuit as shown by current paths indicated by dotted lines in FIGS. 2A and 2B.

During the above-described fast decay illustrated in FIG. 2A, since the regenerative current flows to the power source voltage +24 V, the voltage of the output terminals OUT1B, OUT2B become a sum of the power source voltage +24 V and diode voltage Vfp inside the H bridge control circuit of the motor driver 501. By contrast, during the slow decay illustrated in FIG. 2B, since the regenerative current does not flow to the power source voltage +24 V, the voltage of divided voltage OUT1B/OUT2B at the output terminals OUT1B, OUT2B become substantially zero V (motor current value×transistor ON resistance value). Meanwhile, current paths indicated by thick solid lines in FIGS. 2A and 2B illustrate how the current flows in the H bridge control circuit when the bipolar stepping motor 502 is set in an excitation holding state as described later.

Figure 3:
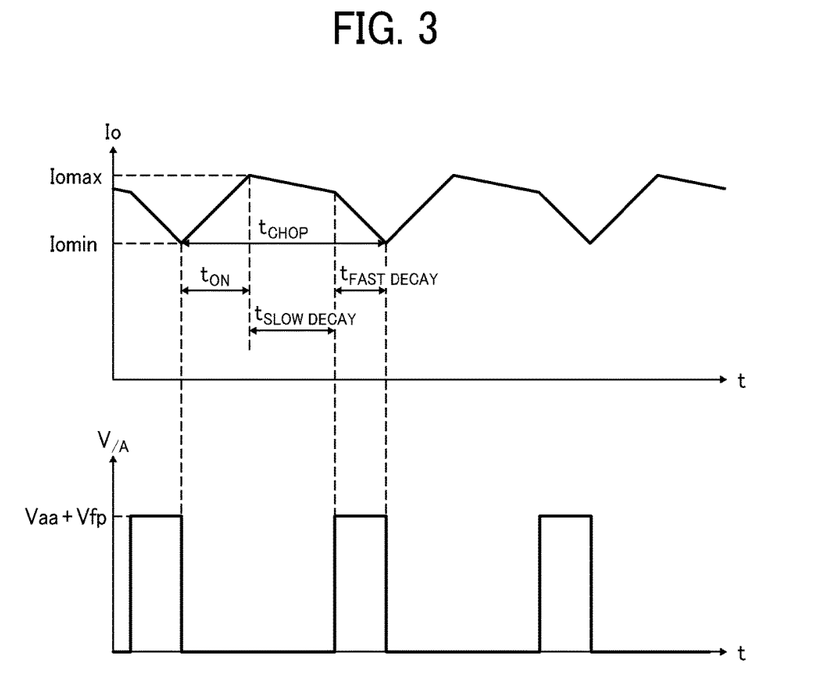
FIG. 3 is a diagram illustrating a waveform related to output current during the slow decay/fast decay periods and a waveform related to output voltage during the slow decay/fast decay periods in a comparative manner as output waveforms relative to time according to the current attenuation method of regenerative current in the motor driver included in the motor drive system illustrated in FIG. 1.

FIG. 3 is a diagram illustrating a waveform related to output current Io during the slow decay/fast decay periods and a waveform related to output voltage $V_{/A}$ during the slow decay/fast decay periods in a comparative manner as output waveforms relative to time t according to the current attenuation method of regenerative current in the motor driver 501 included in the above-described motor drive system.

Referring to FIG. 3, when output of the motor driver 501 is OFF, the chopping control in which the above-described mix decay is performed is executed in the motor drive system according to the embodiment, thereby causing the voltage of output terminals OUT1B, OUT2B to move like a rectangular waveform of the output voltage $V_{/A}$, and in this case, the output current Io forms a zigzag waveform between maximal output current Iomax and minimal output current Iomin. A maximal value of the rectangular waveform of the output voltage $V_{/A}$ is a sum of the diode voltage Vfp and a power supply voltage Vaa. As for the voltage of the divided voltage OUT1B/OUT2B, voltage dividing/smoothing is performed by a filter function performed in the resistances 503 and 504 and the smoothing capacitor 505 related to the first system CR circuit and the resistances 506 and 507 and the smoothing capacitor 508 related to the second system CR circuit.

Here, since duty of a fast decay period $t_{FAST\ DECAY}$ relative a chopping cycle $t_{CHOP}$ is 17%, voltage of about 0.4 V is applied and received in an analog/digital (A/D) converter terminal A/D of the controller 500. The chopping cycle $t_{CHOP}$ corresponds to a sum of: a transistor ON period $t_{ON}$ during which the output current Io is increased at a constant rate so as to reach the maximal output current Iomax from the minimal output current Iomin in at an initial falling of the rectangular waveform of the output voltage $V_{/A}$; a subsequent slow decay period $t_{SLOW\ DECAY}$ during which the output current Io gradually falls at a constant rate; and a subsequent fast decay period $t_{FAST\ DECAY}$ during which the output current Io rapidly falls at a constant rate. However, at this point, in the case where abnormal connection such as fall-off of a connector and disconnection of a harness or motor winding wire occurs relative to the motor driver 501 that drives the bipolar stepping motor 502, current does not flow in the bipolar stepping motor 502. Therefore, the rectangular waveform of the output voltage $V_{/A}$ illustrated in FIG. 3 is not generated, and voltage of about zero V is applied and received in the A/D converter terminal A/D of the controller 500. As a result, the determining function of the controller 500 can determine abnormal connection of the bipolar stepping motor 502 based on a voltage generated during the fast decay period $t_{FAST\ DECAY}$. Meanwhile, in the embodiment, a motor ON state includes: an output ON state; and an output OFF state of the motor driver 501. The output ON state of the motor driver 501 is defined as a state in which current is supplied to the bipolar stepping motor 502 from the motor driver 501 [corresponding to the above-described transistor ON period $t_{ON}$], and the output OFF state of the motor driver 501 is defined as a state in which current is not supplied to the bipolar stepping motor 502 from the motor driver 501 but regenerative current flows by coil current energy accumulated in the bipolar stepping motor 502 [corresponding to the period combining the slow decay period $t_{SLOW\ DECAY}$ with the fast decay period $t_{FAST\ DECAY}$].

Figure 4:
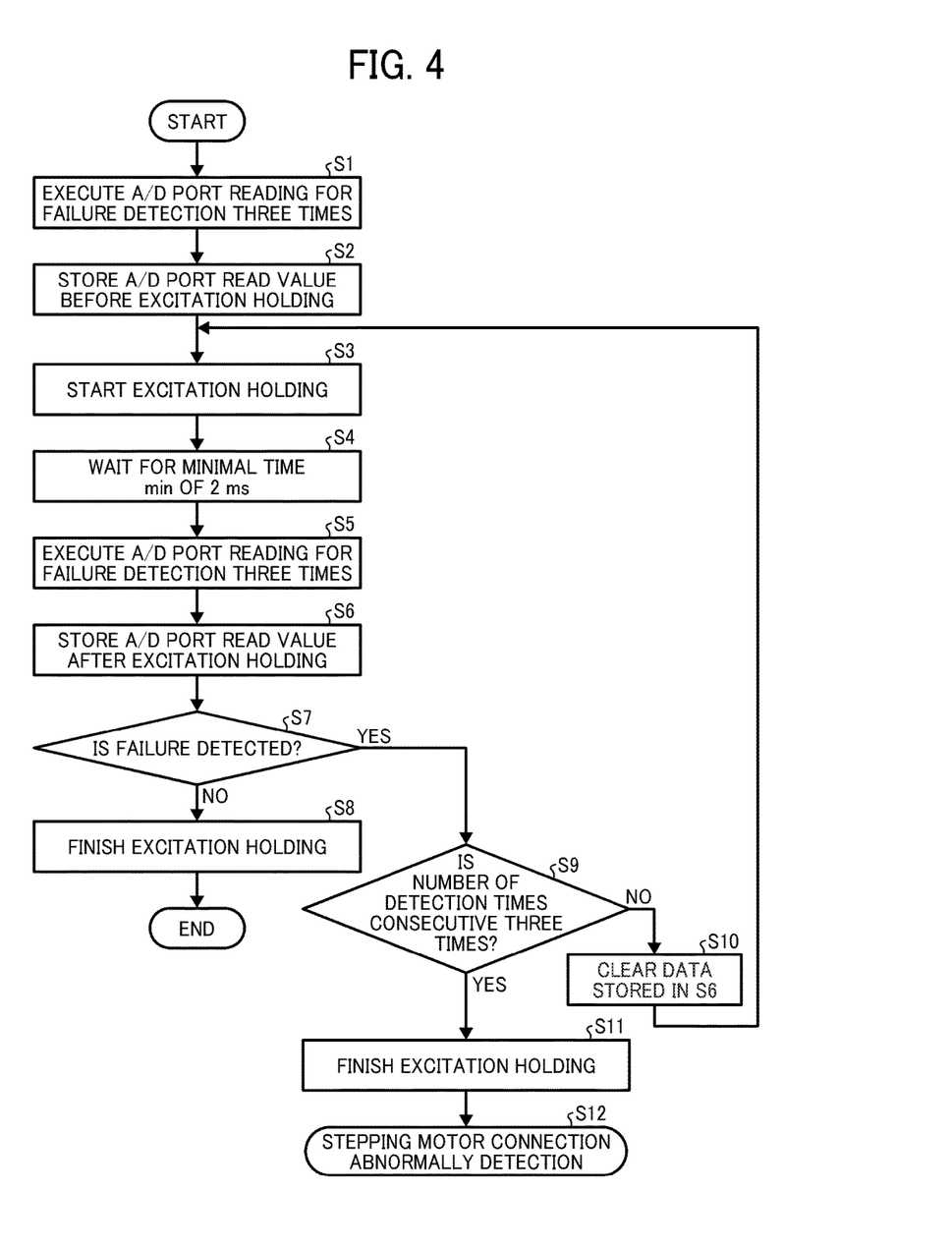
FIG. 4 is a flowchart illustrating operation processing at the time of detecting abnormal connection of a bipolar stepping motor in a controller included in the motor drive system illustrated in FIG. 1.

FIG. 4 is a flowchart illustrating operation processing at the time of detecting abnormal connection of the bipolar stepping motor 502 in the controller 500 included in the above-described motor drive system.

Referring to FIG. 4, in the operation processing of detecting abnormality, performed is processing to execute A/D port reading for failure detection x three times (Step S1) in which an A/D port of the A/D converter terminal A/D in the controller 500 is read three times in a cycle of 2 ms when the bipolar stepping motor 502 is turned OFF by the motor driver 501. Here, data for two phases of A-phase/B-phase is actually read for one bipolar stepping motor 502. After that, processing to store an A/D port read value before excitation holding is performed by storing a central value of the read data (Step S2). For example, a case where a central value of the A-phase is A and a central value of the B-phase is B may be exemplified.

Next, the controller 500 provides the motor driver 501 with a command to start excitation holding of the bipolar stepping motor 502 (Step S3), and waits for a minimal time min of 2 ms (Step S4), and subsequently performs processing to execute A/D port reading for failure detection x three times (Step S5) in which the A/D port of the A/D converter terminal A/D is read three times in a cycle of 2 ms. Here also, data for the two phases of the A-phase/B-phase is actually read for one bipolar stepping motor 502. After that, processing to store an A/D port read value after excitation holding is performed by storing a central value of the read data (Step S6). For example, a case where a central value of the A-phase is A' and a central value of the B-phase is B' may be exemplified.

Subsequently, the controller 500 determines whether failure is detected by determining whether following conditions are satisfied regarding the obtained central values of the A-phase A and A' and central values of the B-phase B and B': failure determination lower limit value≤A'−A≤failure determination upper limit value and also failure determination lower limit value≤B'−B≤failure determination upper limit value; and A'−A<failure determination lower limit value, A−A'>failure determination upper limit value, B'−B<failure determination lower limit value, or B'−B>failure determination upper limit (Step S7). As a result of this determination, when the conditions of "failure determination lower limit value≤A'−A≤failure determination upper limit value" and "failure determination lower limit value≤B'−B≤failure determination upper limit value" are satisfied, it is determined as normal, and processing to finish excitation holding is performed (Step S8), and then operation processing ends, but when one of the conditions of "A'−A<failure determination lower limit value, A−A'>failure determination upper limit value, B'−B<failure determination lower limit value, and B'−B>failure determination upper limit value is satisfied, it is determined as abnormal, and the operation processing shifts to determination on whether the number of times of detecting abnormality is consecutive three times (Step S9). Meanwhile, a reason for calculating differences of A'−A and B'−B related to the central values A and A' of the A-phase and the central values B and B' of the B-phase is in order to cancel an offset error of the A/D converter terminal of the controller 500, and as a threshold of failure determination, the failure determination lower limit value may be set to 0.2 V and the failure determination upper limit value may be set to 0.8 V, for example.

As a result of determining whether the above-described number of times of detecting abnormality is consecutive three times (Step S9), when the number of times of detecting abnormality is less than consecutive three times, the operation processing returns to the processing before the processing to start excitation holding (Step S3) after clearing the data (Step S10) stored in the processing to store the A/D port read value after previous excitation holding (Step S6), and repeats the processing thereafter. However, when the number of times of detecting abnormality reaches the consecutive three times, excitation holding is finished (Step S11), and the bipolar stepping motor 502 is deemed abnormal and then processing to detect stepping motor abnormality is performed (Step S12).

By the way, a reason for detecting abnormality in the excitation holding state is as follows: when the bipolar stepping motor 502 is rotated in the transistor ON state by the motor driver 501, current flows alternately in the current path and the current path reversed thereto illustrated in FIGS. 2A and 2B, and when the current flows in the reversed current path, voltage of about zero V is applied and received in the A/D converter terminal A/D of the controller 500, and therefore a level of smoothed voltage received in the A/D converter terminal A/D is reduced and detection accuracy is degraded. Due to this, in the embodiment, detection is performed in the excitation holding state in which current flows only along the current path indicated by the thick solid lines in the H bridge control circuit illustrated in FIGS. 2A and 2B. Meanwhile, in the operation processing related to detection of abnormal connection described with reference to FIG. 4, voltage values in pre-excitation holding having no current flow in the bipolar stepping motor 502 and post-excitation holding having current flow are measured respectively, and a difference therebetween is calculated, and then an offset is cancelled based on the difference between the period having current flow and the period having no current flow. In addition to that, the voltage values of the two phases are measured by simultaneously supplying current to the A-phase and B-phase during excitation holding.

As described above, the motor connection detecting device according to the present embodiment determines abnormal connection of the bipolar stepping motor 502 based on the voltage generated during the fast decay period $t_{FAST\ DECAY}$ according to the current attenuation method of regenerative current. Additionally, the voltage used for this determination is the voltage when the bipolar stepping motor 502 is set in the excitation holding state. Furthermore, in current control, the chopping control drive is performed for the bipolar stepping motor, and the voltage is detected at the timing of the fast decay period $t_{FAST\ DECAY}$ that represents an OFF period during the chopping control drive. A method according to motor connection detection in the present embodiment differs from a method of detecting voltage of a motor power source via a motor winding wire during motor OFF time like the related art. In other words, since the voltage generated by the regenerative current during motor ON time is detected, abnormal connection such as fall-off of a connector and disconnection of a harness or a motor winding wire can be surely detected even in the case where the detection target is the bipolar stepping motor 502.

Figure 5:
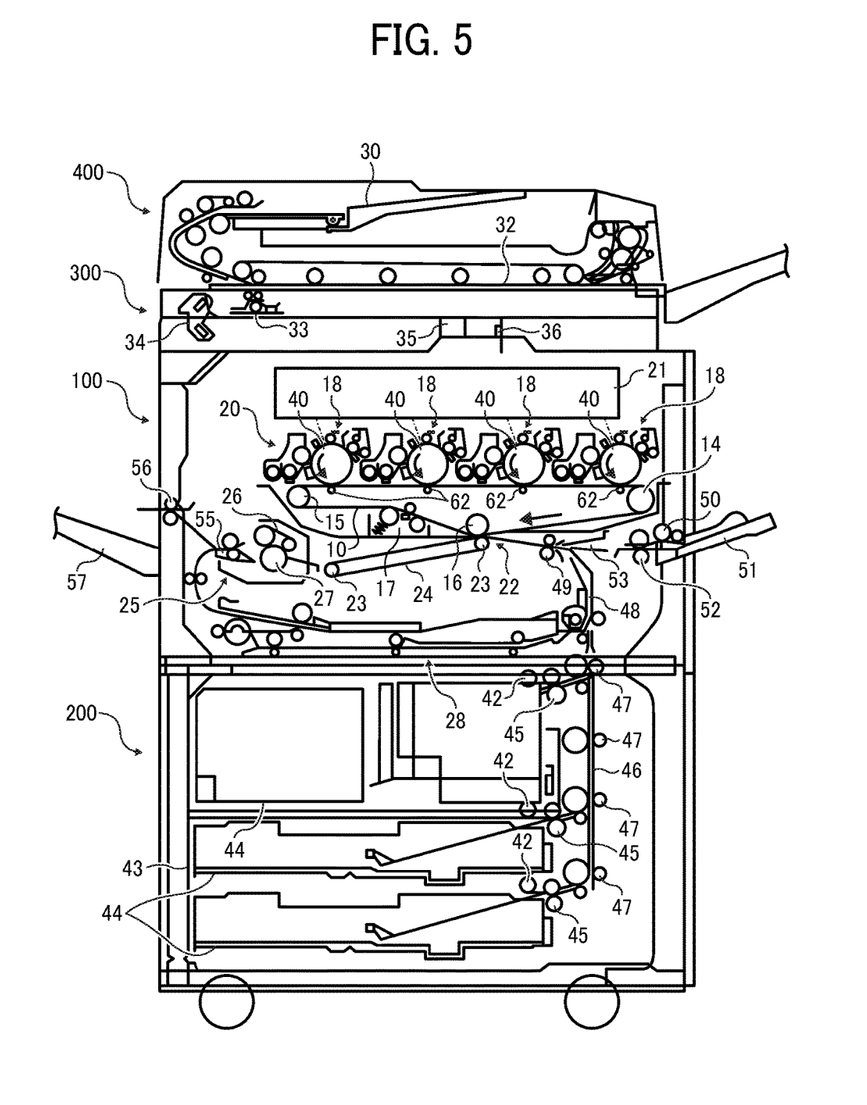
FIG. 5 is a mechanical schematic view from a side surface direction, illustrating a basic structure of an image forming device applying the motor drive system illustrated in FIG. 1.

FIG. 5 is a mechanical schematic view from a side surface direction, illustrating a basic structure of an image forming device 100 applying the above-described motor drive system.

Referring to FIG. 5, the image forming device 100 is an LP type of MFP specifications, in which an intermediate transfer unit is disposed in the center and the intermediate transfer unit is provided with an intermediate transfer belt 10 that is an endless belt. The intermediate transfer belt 10 is a multi-layer belt in which an elastic layer is provided on a base layer formed of a material that hardly stretches, such as a fluorine resin that little stretches or a highly-elastic rubber material combined with canvas. The elastic layer is made by forming a coating layer having excellent smoothness obtained by, for example, coating a surface of a fluorine-based rubber or an acrylonitrile butadiene copolymer rubber with, for example, a fluorine-based resin. The intermediate transfer belt 10 is passed around and rotated by three support rollers 14 to 16, and rotationally driven clockwise.

An intermediate transfer body cleaning unit 17 is provided on the left side of the support roller 16 and adapted to remove residual toner remaining on the intermediate transfer belt 10 after image transfer. The intermediate transfer belt 10 between the support rollers 14 and 15 is provided with an image formation device 20 formed of photoconductor units 40 of respective colors of black (K), yellow (Y), magenta (M), and cyan (C), a charge unit 18, a developing unit, and a cleaning unit. The image formation device 20 includes an IC tag and is attached to a body of the image forming device 100 in a detachable manner. A writing unit 21 adapted to emit laser light in order to form an image on a photoconductor drum of the photoconductor unit 40 of each color is provided above the image formation device 20. Meanwhile, the motor drive system described in the embodiment can be applied to a drum drive motor that rotationally drives the photoconductor drum of each color here.

A secondary transfer unit 22 is provided below the intermediate transfer belt 10. The secondary transfer unit 22 is disposed in a manner pushing up and pressing the intermediate transfer belt 10 against the support roller 16 by passing, between two rollers 23, a secondary transfer belt 24 that is an endless belt. The secondary transfer belt 24 transfers an image on the intermediate transfer belt 10 to a paper. A fixing unit 25 adapted to fix the transferred image on the paper is provided beside the secondary transfer unit 22, and the paper to which a toner image is transferred is fed thereto. The fixing unit 25 is formed by pressing a heating/pressurizing roller 27 against a fixing belt 26 that is an endless belt. A sheet reversing unit 28 is provided below the secondary transfer unit 22 and the fixing unit 25 and reverses front and back sides of a paper in order to record an image on the back side of the paper immediately after an image is formed on the front side.

When a start switch of an operating section is pushed, in the case where there is a document on a document feeding stage 30 of an automatic document feeder (ADF) 400, the document is fed to above a contact glass 32. In the case where there is no document on the document feeding stage 30, a scanner of an image reading unit 300 is driven in order to read a document manually placed on the contact glass 32, and a first carriage 33 and a second carriage 34 are driven to perform reading and scanning. After that, light is emitted from a light source above the first carriage 33 to the contact glass 32, and also the light reflected from the document is reflected by a first mirror above the first carriage 33 and directed to the second carriage 34, and the light is reflected by a mirror above the second carriage 34 and passes through an imaging forming lens 35, and an image is formed on a CCD 36 that is a reading sensor. Recording data for each color is generated based on an image signal obtained in the CCD 36.

Furthermore, when the start switch is pushed, rotational drive of the intermediate transfer belt 10 is started and also preparation of image formation in the respective units of the image formation device 20 is started. Then, an image formation sequence for each color image formation is started, exposure laser modulated based on recording data of each color is projected to the photoconductor drum of each color, and a toner image of each color is transferred on the intermediate transfer belt 10 in an superimposing manner as a piece of image by an image formation process of each color. When an edge of this toner image enters the secondary transfer unit 22, a paper is fed to the secondary transfer unit 22 at appropriate timing such that an edge of a paper enters the secondary transfer unit 22 at the same time, thereby transferring the toner image on the intermediate transfer belt 10 to the paper. The paper to which the toner image is transferred is fed to the fixing unit 25 in which the toner image is fixed on the paper.

The above-described paper is sent to the secondary transfer unit 22 at the above-described timing after a following procedure: one of paper feeding rollers 42 of a paper feeding table 200 is selectively and rotationally driven, sheets are sent out from one of paper feeding trays 44 provided in multiple stages in the paper feeding unit 43, only one piece is separated by a separation roller 45, introduced into a paper feeding path 46, conveyed by a conveyance roller 47, guided to a conveying roller unit 48 inside the image forming device 100, and then made to butt against a registration roller 49 of the conveying roller unit 48, and then stopped. The paper may also be fed by being inserted into a manual paper feeding unit 51. When a user inserts papers into the manual paper feeding unit 51, the image forming device 100 rotationally drives a paper feeding roller 50 to separate one piece of sheets on the manual paper feeding unit 51 by a separation roller 52 and pulls the sheet into a manual paper feeding path 53, and the paper is made to butt against the registration roller 49 and stopped in the same manner. Meanwhile, the motor drive system described in the embodiment can be also applied to a DC motor that rotationally drives the conveyance roller 47 here.

Various kinds of sensors including, for example, a photo sensor are mounted on the paper feeding table 200, and for example, a paper end sensor adapted to detect a remaining amount and presence of a paper stored in the paper feeding trays 44, a size detection sensor adapted to detect a size and orientation of a paper, a tray set detection sensor adapted to detect whether each of the paper feeding trays 44 is set in the image forming device 100, and the like may be exemplified. Besides, each of the paper feeding trays 44 is provided with a paper conveyance sensor adapted to detect whether papers are suitably conveyed during conveyance and whether any conveyance jam (paper jam) occurs. A paper ejected after being subject to the fixing processing at the fixing unit 25 is guided to an ejection roller 56 by a switching pawl 55 and stacked on a paper ejection tray 57, or guided to the sheet reversing unit 28 by the switching pawl 55, reversed in this unit, introduced to a transfer position again, and ejected onto the paper ejection tray 57 by the ejection roller 56 after an image is recorded also on a back side thereof.

By the way, the residual toner remaining on the intermediate transfer belt 10 after image transfer is removed by the intermediate transfer body cleaning unit 17 to be ready for next image forming. In most cases, the registration roller 49 is generally grounded for use, but a bias voltage may also be applied in order to remove paper dust from the paper. For example, in order to apply bias by using a conductive rubber roller, a case of adopting a conductive NBR rubber having a diameter 18 mm and a surface thickness of 1 mm may be exemplified. Electric resistance is about 109 Ωcm due to volume resistance of the rubber material. A surface of a paper having passed through the registration roller 49 to which the bias is thus applied is slightly negatively charged. Therefore, in the case of performing transfer from the intermediate transfer belt 10 to a sheet, transfer conditions may be changed due to change of the transfer conditions compared to a case of not applying the voltage to the registration roller 49. Considering this, as for the intermediate transfer belt 10, a voltage of about −800 V is applied to the side to which toner is transferred (front side), and a voltage of about +200 V is applied by a transfer roller 62 to a back side of the paper.

In the case where the bipolar stepping motor 502 in the motor drive system (motor connection detecting device) described in the embodiment is applied to the DC motor that drives the conveyance roller 47 and the drum drive motor adapted to rotationally drive the photoconductor drum of the photoconductor unit 40 in the image forming device 100, abnormal connection such as fall-off of a connector and disconnection of a harness or a motor winding wire can be surely detected.

The motor connection detecting device and the motor drive system of the present invention can be applied not only to the above-described image forming device 100 as the image forming device but also to an automobile, a robot, or apparatuses in various fields in which a rotational drive system such as an amusement machine is needed.

Furthermore, the motor connection detecting device and the motor drive system of the present invention may also be used for a motor that drives a conveyance roller in a conveyance device adapted to convey a sheet such as prepreg, a plastic sheet, and a bill.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A motor connection detecting device comprising:
a bipolar stepping motor;
a motor driver configured to control current to be supplied to the bipolar stepping motor; and
a controller connected to the bipolar stepping motor and the motor driver, the controller configured to,
detect voltage of regenerative current generated during motor ON time in which current flows in the bipolar stepping motor, the voltage being generated during a fast decay period according to a current attenuation method of the regenerative current, and
determine a presence of an abnormal connection between motor winding wires of the bipolar stepping motor and terminals of the motor driver based on the voltage.

2. The motor connection detecting device according to claim 1, wherein the controller is configured to detect the voltage when the bipolar stepping motor is set in an excitation holding state.

3. The motor connection detecting device according to claim 2, wherein
the motor driver is configured to perform chopping control drive for the bipolar stepping motor, and
the controller is configured to detect the voltage at timing of the fast decay period which represents an OFF period during the chopping control drive performed by the motor driver.

4. The motor connection detecting device according to claim 1, wherein
the controller is configured to generate a control command to control an amount of the current by the motor driver.

5. An image forming device comprising:
the motor connection detecting device according to claim 4,
wherein the bipolar stepping motor is applied to at least one of a DC motor configured to drive a conveyance roller and a drum drive motor configured to rotationally drive a drum.

6. A conveyance device comprising:
the motor connection detecting device according to claim 4,
wherein the bipolar stepping motor is applied to a motor configured to drive a conveyance roller.

7. The motor connection detecting device according to claim 1, wherein the controller is configured to determine the presence of the abnormal connection based on the voltage during an excitation holding state such that the voltage is measured only when current flows through the motor driver via a first one of a pair of current paths associated with the motor driver.

8. The motor connection detecting device according to claim 7, wherein the controller is configured to determine the presence of the abnormal connection by cancelling an offset error between a first current value in a period prior to the excitation holding state and a second current value in a period after the excitation holding state.

9. A motor connection detecting method comprising:
controlling current supplied to a bipolar stepping motor by a motor driver;
detecting, by a controller connected between the bipolar stepping motor and the motor driver, voltage of regenerative current generated during a motor ON time in which current flows in the bipolar stepping motor, the voltage being a voltage generated during a fast decay period according to a current attenuation method of the regenerative current; and
determining, by the controller, a presence of an abnormal connection between motor winding wires of the bipolar stepping motor and terminals of the motor driver based on the voltage detected in the detecting.

10. The motor connection detecting method according to claim 9, wherein
in the detecting, the voltage is detected when the bipolar stepping motor is set in an excitation holding state.

11. The motor connection detecting method according to claim 10, wherein
in the controlling, chopping control drive is performed for the bipolar stepping motor, and
in the detecting, the voltage is detected at timing of the fast decay period which represents an OFF period during the chopping control drive performed in controlling the current.

12. The motor connection detecting method according to claim 9, wherein the determining determines the presence of the abnormal connection based on the voltage during an excitation holding state such that the voltage is measured only when current flows through the motor driver via a first one of a pair of current paths associated with the motor driver.

13. The motor connection detecting method according to claim 12, wherein the determining determines the presence of the abnormal connection by cancelling an offset error between a first current value in a period prior to the excitation holding state and a second current value in a period after the excitation holding state.

* * * * *